(12) United States Patent
Bonna et al.

(10) Patent No.: US 7,134,795 B1
(45) Date of Patent: Nov. 14, 2006

(54) OPTICAL FIBER CONNECTOR ARRANGEMENT

(75) Inventors: Ulrich Bonna, Trossingen (DE); Bernd Armbruster, Aichhalden (DE); Stefan Fuchs, Boehringen (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 215 days.

(21) Appl. No.: 10/855,943

(22) Filed: May 28, 2004

(30) Foreign Application Priority Data

May 30, 2003 (EP) .................................. 03012348

(51) Int. Cl.
*G02B 6/36* (2006.01)
(52) U.S. Cl. ............................... 385/82; 385/78; 385/85
(58) Field of Classification Search ................ 385/78, 385/82, 85
See application file for complete search history.

(56) References Cited

U.S. PATENT DOCUMENTS

| 4,158,476 A | 6/1979 | McCartney |
| 4,174,882 A | 11/1979 | McCartney |
| 4,183,619 A | 1/1980 | Makuch |
| 4,220,394 A | 9/1980 | Tardy |
| 4,490,006 A * | 12/1984 | Lidholt ........................ 385/78 |
| 4,815,811 A | 3/1989 | Crosnier et al. |

FOREIGN PATENT DOCUMENTS

| DE | 27 04 140 | 8/1978 |
| DE | 34 42 839 | 5/1986 |
| DE | 37 06 650 | 9/1987 |
| EP | 0 095 281 | 11/1983 |
| EP | 0 107 035 | 5/1984 |
| EP | 0 165 837 | 12/1985 |
| EP | 0 185 413 | 6/1986 |
| EP | 0 246 165 | 11/1987 |
| EP | 0 863 419 | 3/1997 |
| FR | 864 114 | 4/1941 |
| FR | 2 528 587 | 12/1983 |

* cited by examiner

*Primary Examiner*—Frank G. Font
*Assistant Examiner*—Michael P. Mooney
(74) *Attorney, Agent, or Firm*—Fish & Richardson P.C.

(57) ABSTRACT

An optical fiber connector includes a sleeve having a first end surface, an abutment having a second end surface, the abutment being located within the sleeve and axially movable within the sleeve, and at least three balls located between the first end surface and the second end surface within the sleeve for clamping an optical fiber, the balls having centers disposed in a plane and being axially and radially displaceable in the sleeve and biased radially inwardly toward a central axis of the sleeve. At least one of the first end surface and the second end surface includes a conical surface.

20 Claims, 2 Drawing Sheets

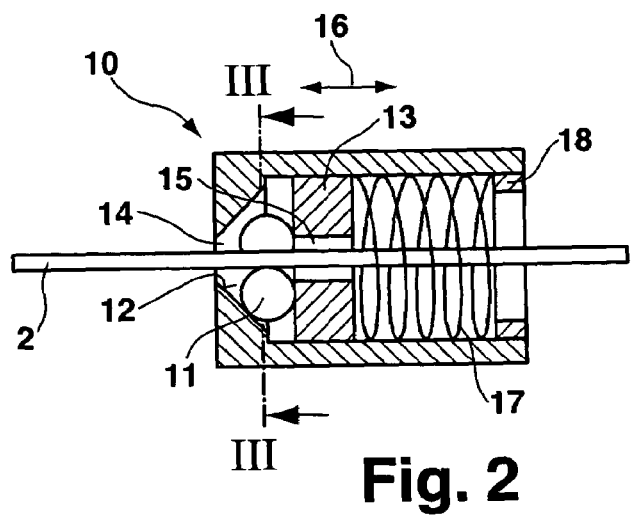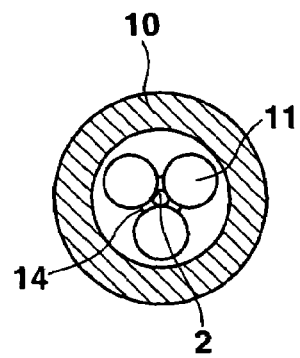
Fig. 2  Fig. 3
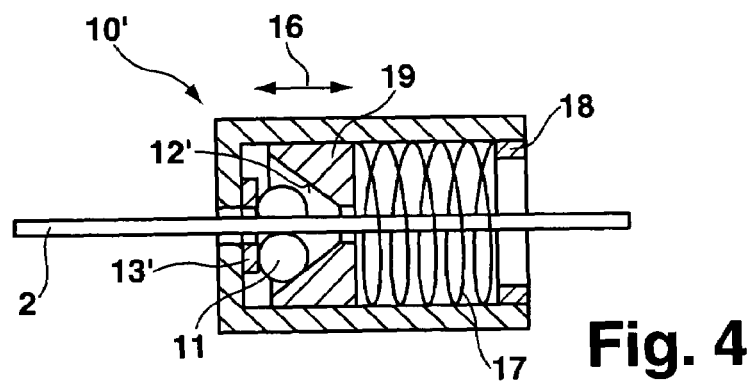
Fig. 4
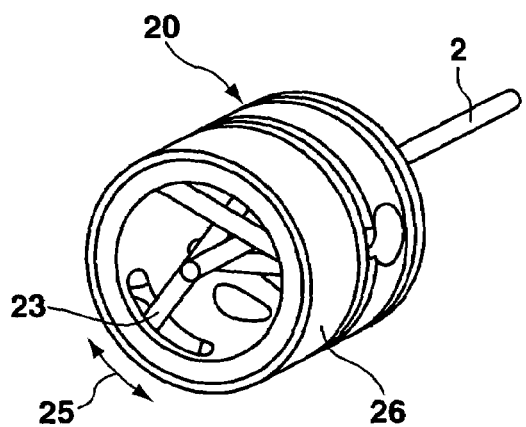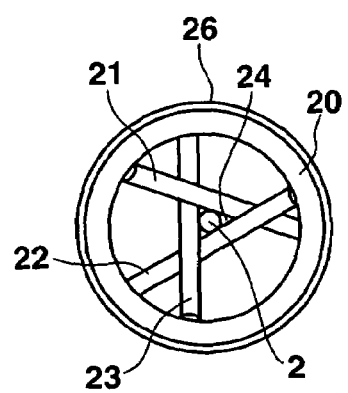
Fig. 5  Fig. 6

OPTICAL FIBER CONNECTOR ARRANGEMENT

CLAIM OF PRIORITY

This application claims priority under 35 USC § 119(a) to patent application serial number EP 03 012 348.3, filed on May 30, 2003, the entire contents of which is hereby incorporated by reference.

TECHNICAL FIELD

The present invention relates to optical fibers and, more particularly to an optical fiber connector arrangement.

BACKGROUND

Optical fibers, which are used for transmitting high power laser light, include a light-guiding core and at least one cladding that has a lower optical refractive index than the light-guiding core, due to a dopant in the cladding, such that, up to certain angles, total reflection is produced at the interface between the core and the cladding. A protective jacket surrounds the cladding. In optical fiber production, either the core diameter may be produced to have smaller tolerances and the cladding diameter larger tolerances or vice versa. The beam quality of the light guided in the optical fiber is generally better when smaller tolerances of the diameter of the light-guiding core are used.

German patent application serial number DE 2853649 C2 discloses two connectors for coupling two optical fibers. Each connector has a sleeve that is disposed to be axially resilient, with three balls that are disposed in one plane and between which the optical fiber is clamped. The balls simultaneously center the optical fiber and define the jacket diameter of the optical fiber relative to the three balls. When two connectors are connected, the balls of each connector are aligned with each other, and the jacket diameters of both optical fibers are concentrically aligned to each other. However, the production of optical fibers entails eccentricities between core and jacket, such that the light-guiding cores may be disposed in a corresponding eccentric relation to each other, with the consequence that a large portion of the light energy is not coupled from one fiber into the other fiber but is absorbed in the connector and converted into waste heat.

For solid state lasers, such as, for example, a Nd:YAG laser, the beam quality tends to increase at higher output powers. When the high power solid state laser beam is transported in an optical fiber, to obtain this beam quality also on a work piece to be processed, the cross-section of the light-guiding core of the optical fiber must be reduced. To ensure "plug and play" capability of the optical cable on the laser or on the processing unit with minimum loss, the light-guiding core of the laser optical fiber must be positioned in a very precise manner in a radial direction within the connector.

SUMMARY

An optical fiber connector arrangement having a least three balls that are simultaneously displaced radially and axially with a sleeve of the connector can be used to fix the location of the core of an optical fiber.

In a first general aspect, an optical fiber connector includes a sleeve having a first end surface, an abutment having a second end surface, the abutment being located within the sleeve and axially movable within the sleeve, and at least three balls located between the first end surface and the second end surface within the sleeve for clamping an optical fiber, the balls having centers disposed in a plane and being axially and radially displaceable in the sleeve and biased radially inwardly toward a central axis of the sleeve. At least one of the first end surface and the second end surface includes a conical surface.

In another general aspect, an optical fiber connector includes an optical fiber, a sleeve having an first end surface, an abutment having a second end surface, the abutment being located within the sleeve and axially movable within the sleeve, at least three balls located between the first end surface and the second end surface within the sleeve, the balls having centers disposed in a plane and being axially and radially displaceable in the sleeve and biased radially inwardly toward a central axis of the sleeve against the optical fiber and clamping the optical fiber in a fixed position, where at least the first end surface or the second end surface includes a conical surface, and a housing having a central opening larger than an outer diameter of the sleeve, where the sleeve is fixed within the central opening in a position in which a core of the optical fiber is positioned on a central axis of the housing.

One or more of the following features may be included. For example, the conical surface can have a conical angle of about 60° to about 120°, or a conical angle of about 90°. The optical fiber connector can further include a spring for biasing the first end surface and the second end surface towards each other. The spring can be supported on an axially adjustable spring abutment within the sleeve. The optical fiber connector can further include a housing having a central opening larger than an outer diameter of the sleeve, where the sleeve is fixed within the central opening in a position in which a central core of an optical fiber clamped by the balls can be fixed on the central axis. The sleeve can be fixed within the housing through material-bonding or by an adhesive in a non-positive manner. Each ball can provide a radially inwardly biased fixing point for clamping an optical fiber. The balls can include a material selected from the group consisting of quartz glass, ceramic, and polished metal. The metal material can include a reflecting coating.

In another general aspect, an optical fiber connector arrangement includes an optical fiber, a connector, and a sleeve disposed within a central opening of the connector and in which the light guide is clamped by mutually crossing round pins that form a triangular clamping opening that is larger than an outer diameter of the sleeve and that is centered on a central axis of the connector.

One or more of the following features may be included. For example, at least one pin can be an adjustable pin that can be adjusted to change the cross-section of the triangular clamping opening. One end of the adjustable pin can be fixed in the sleeve and the other end can be disposed such that it can be deflected.

In another general aspect, a method for clamping an optical fiber into a position on a central axis of an optical fiber connector includes, obtaining an optical fiber connector that includes at least three balls, arranging the balls around the optical fiber and between a first end surface of a sleeve that is positioned with the connector and a second end surface of an abutment positioned with the connector, where at least one of the first end surface and the second end surface includes a conical surface, and displacing the first end surface towards the second end surface to cause axial displacement of the balls and radial displacement of the balls towards the central axis and against an outer surface of the optical fiber.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

FIG. 2 is an enlarged view of the sleeve for holding an optical fiber.

FIG. 3 is a cross-sectional view of the sleeve through the line III—III of FIG. 2.

FIG. 4 is an enlarged view of the sleeve for holding an optical fiber.

FIG. 5 is a perspective view of a sleeve for holding an optical fiber connector arrangement.

FIG. 6 is an end view of the sleeve of FIG. 5.

Like reference symbols in the various drawings indicate like elements.

DETAILED DESCRIPTION

Figure 1:
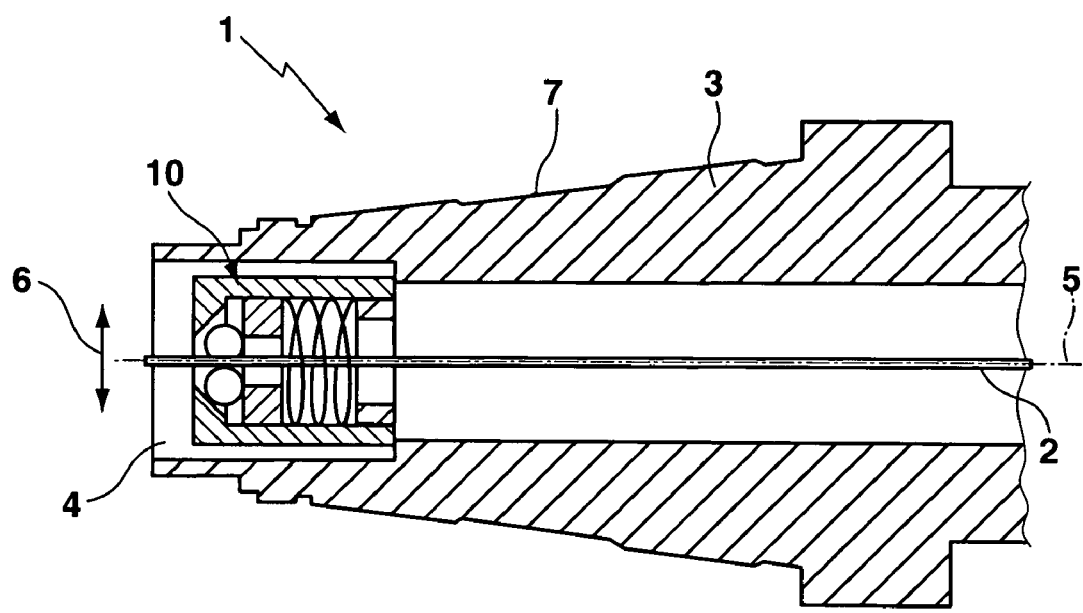
FIG. 1 is a longitudinal sectional view of an optical fiber connector arrangement with an optical fiber that is held in a sleeve.

An optical fiber connector arrangement 1, as shown in FIG. 1, includes a sleeve 10, in which the jacket of an optical fiber 2 is clamped, and a connector housing 3 with a central opening 4, in which the sleeve 10 is mounted. The diameter of the opening 4 is larger than the outer diameter of the sleeve 10 that is fixed in the opening 4 in that position, in which the light-guiding core of the optical fiber 2, which is clamped in the sleeve 10, is centered to the connector axis 5. The sleeve 10 is aligned in the connector housing 3 through an adjuster that engages with the sleeve 10 and radially displaces the sleeve in the opening 4 in a direction shown by the double arrow 6 until the optical fiber core of the clamped optical fiber 2 is adjusted coaxially to the connector axis 5 or concentrically to its conical connector surface 7. When this position has been reached, the sleeve 10 is rigidly connected to the connector housing 3 through material-bonding, in a non-positive fashion or by an adhesive (e.g., by welding, soldering, gluing, clamping).

As shown in FIGS. 2 and 3, the optical fiber 2 is held in the sleeve 10 by three quartz glass balls 11 that are disposed in one plane such that they are mutually offset by 120° and are disposed between a cone 12, provided in the sleeve 10, and an abutment 13. The cone 12 and the abutment 13 each have a central opening 14, 15 for the optical fiber 2. The abutment 13 is formed as a pressure plate and is disposed in the sleeve 10 such that it can be axially displaced in a direction shown by the double arrow 16 and is biased by an axially acting pressure spring 17 in the direction towards the cone 12. The pressure spring 17 is supported in the sleeve 10 on a spring abutment 18 (e.g., a threaded ring) that can be axially displaced to set the spring force acting on the abutment 13 and thereby of the bias acting on the balls 11.

The pressure spring 17 applies a force to the balls 11 through the abutment 13 and causes the balls 11 to contact the cone 12, where the axial force is divided also into a force component that acts radially on the balls 11 such that the balls 11 exert a radial force on the laser optical fiber 2, thereby keeping the optical fiber free from play. The pressing force acting on the optical fiber 2 is defined by the conical angle (e.g., 90°) and the spring force of the pressure spring 17. The conical angle need not be 90° and can vary (e.g., from 60° to about 120°).

In case of a temperature change, the balls 11 permit radial expansion of the optical fiber 2 against the force of the pressure spring 17 as well as change of the axial length between the optical fiber 2 and the sleeve 10 due to different longitudinal expansion coefficients of the various components. The ability of the connector arrangement 1 to adapt to temperature changes allows the position of the optical fiber 2 in the connector housing 3 to remain fixed and to maintain stability over the entire working temperature range of the connector arrangement 1, thereby preventing play in the position of the optical fiber 2 or deformation forces acting on the optical fiber 2 due to temperature changes. Also, diameter changes and changes of the axial length of the optical fiber 2 or of the connector housing 3 due to temperature changes are possible without producing play in position of the optical fiber 2 or external forces on the optical fiber 2, which would cause tension in, and deformation of, the optical fiber 2. The tolerance of the optical fiber's jacket diameter has little or no effect on centering of the optical fiber 2, thus permitting production of optical fibers with very narrow core diameter tolerances, which has a positive effect on the beam quality of the laser system.

Compared to the sleeve 10, a sleeve 10' shown in FIG. 4 differs in that the cone 12' is provided on a pressure plate 19 that is disposed such that it can be axially displaced in a direction shown by the double arrow 16, and an abutment 13' is mounted to the bottom of the sleeve 10'. The pressure plate 19 is loaded by the pressure spring 17 and forces the balls 11 against the abutment 13' and, due to the cone 12', also against the optical fiber 2.

In another embodiment, a sleeve 20, as shown in FIGS. 5 and 6, includes three mutually crossing round pins 21, 22, and 23 of quartz glass. The pins, which are disposed at angles of 120°, form a triangular, equally-sided clamping opening 24 within the sleeve 20, in which the optical fiber 2 is clamped. Two pins 21 and 22 are tightly fixed in the sleeve 20, while the third pin 23 can be disposed in the sleeve 20, such that the third pin 23 can be adjusted along the direction of the double arrow 25. One end of the third pin 23 is therefore fixed in the sleeve 20 and the other end is fixed in a ring 26, which can be rotatably disposed outside on the sleeve 20. When the optical fiber 2 has been inserted into the clamping opening 24, the ring 26 can be rotated until the third pin 23 positions the optical fiber 2, such that the optical fiber 2 tangentially abuts all three pins in one plane. The ring 26 can be fixed to the sleeve 20 in this position. In case of temperature changes, the pins 21, 22, and 23 permit radial extension of the optical fiber 2 either due to their elasticity or against the action of a torsion spring (not shown) acting on the third pin 23 as well as change of the axial length between the optical fiber 2 and sleeve 20 due to different longitudinal expansion coefficients of the various components.

The balls 11 and pins 21, 22, and 23 can be produced from quartz glass that has a high transmission factor for laser light of the corresponding wavelength of a solid state laser, or from ceramics that have a high temperature stability. Alternatively, the balls 11 and pins 21, 22, and 23 can be produced from a metallic material, which can be polished or provided with a highly-reflecting coating (e.g., of gold) and therefore mainly reflect the laser radiation. This can reduces the detrimental influence of the laser radiation on the optical fiber holder due to scattered radiation and radiation that is not coupled into the optical fiber 2 during adjustment or in case of imperfect radial orientation.

The optical fiber connector arrangement 1 can be used to accurately position an optical fibers 2, for example, when light from one optical fiber 2 is coupled to another optical fiber.

Other Embodiments

A number of embodiments of the invention have been described. Nevertheless, it will be understood that various modifications may be made. Accordingly, other embodiments are within the scope of the following claims.

What is claimed is:

1. An optical fiber connector comprising:
a sleeve having a first end surface;
an abutment having a second end surface, the abutment being located within the sleeve and axially movable within the sleeve;
at least three balls located between the first end surface and the second end surface within the sleeve for clamping an optical fiber, the balls having centers disposed in a plane and being axially and radially displaceable in the sleeve and biased radially inwardly toward a central axis of the sleeve; and
a housing having a central opening larger than an outer diameter of the sleeve, wherein the sleeve is fixed within the central opening of the housing, in a non-positive manner, in a position in which a central core of an optical fiber clamped by the balls can be fixed on the central axis;
wherein at least one of the first end surface and the second end surface includes a conical surface.

2. The optical fiber connector of claim 1, wherein the conical surface has a conical angle of about 60° to about 120°.

3. The optical fiber connector of claim 1, wherein the conical surface has a conical angle of about 90°.

4. The optical fiber connector of claim 1, further comprising a spring for biasing the first end surface and the second end surface towards each other.

5. The optical fiber connector of claim 4, wherein the spring is supported on an axially adjustable spring abutment within the sleeve.

6. The optical fiber connector of claim 1, wherein each ball provides a radially inwardly biased fixing point for clamping an optical fiber.

7. The optical fiber connector of claim 1, wherein the balls include a material selected from the group consisting of quartz glass, ceramic, and polished metal.

8. The optical fiber connector of claim 7, wherein the metal material includes a reflecting coating.

9. An optical fiber connector comprising:
an optical fiber;
a sleeve having an first end surface;
an abutment having a second end surface, the abutment being located within the sleeve and axially movable within the sleeve;
at least three balls located between the first end surface and the second end surface within the sleeve, the balls having centers disposed in a plane and being axially and radially displaceable in the sleeve and biased radially inwardly toward a central axis of the sleeve against the optical fiber and clamping the optical fiber in a fixed position, wherein at least the first end surface or the second end surface includes a conical surface; and
a housing having a central opening larger than an outer diameter of the sleeve, wherein the sleeve is fixed within the central opening of the housing, in a non-positive manner, in a position in which a core of the optical fiber is positioned on a central axis of the housing.

10. The optical fiber connector of claim 9, wherein the conical surface has a conical angle of about 60° to about 120°.

11. The optical fiber connector of claim 9, wherein the conical surface has a conical angle of about 90°.

12. The optical fiber connector of claim 8, further comprising a spring for biasing the first end surface and the second end surface towards each other.

13. The optical fiber connector of claim 9, wherein the spring is supported on an axially adjustable spring abutment within the sleeve.

14. An optical fiber connector comprising:
a sleeve having a first end surface;
an abutment having a second end surface, the abutment being located within the sleeve and axially movable within the sleeve;
at least three balls located between the first end surface and the second end surface within the sleeve for clamping an optical fiber, the balls having centers disposed in a plane and being axially and radially displaceable in the sleeve and biased radially inwardly toward a central axis of the sleeve; and
a housing having a central opening larger than an outer diameter of the sleeve, wherein the sleeve is fixed within the central opening of the housing, by an adhesive, in a position in which a central core of an optical fiber clamped by the balls can be fixed on the central axis; and
wherein at least one of the first end surface and the second end surface includes a conical surface.

15. The optical fiber connector of claim 14, wherein the conical surface has a conical angle of about 60° to about 120°.

16. The optical fiber connector of claim 14, further comprising a spring for biasing the first end surface and the second end surface towards each other.

17. The optical fiber connector of claim 16, wherein the spring is supported on an axially adjustable spring abutment within the sleeve.

18. An optical fiber connector comprising:
a sleeve having a first end surface;
an abutment having a second end surface, the abutment being located within the sleeve and axially movable within the sleeve;
at least three balls located between the first end surface and the second end surface within the sleeve for clamping an optical fiber, the balls having centers disposed in a plane and being axially and radially displaceable in the sleeve and biased radially inwardly toward a central axis of the sleeve, wherein the balls include a polished metal material having a reflective coating;

wherein at least one of the first end surface and the second end surface includes a conical surface.

19. The optical fiber connector of claim 18, further comprising a housing having a central opening larger than an outer diameter of the sleeve, wherein the sleeve is fixed within the central opening in a position in which a central core of an optical fiber clamped by the balls can be fixed on the central axis.

20. The optical fiber connector of claim 18, wherein each ball provides a radially inwardly biased fixing point for clamping an optical fiber.

* * * * *